US012093067B1

(12) United States Patent
Huang et al.

(10) Patent No.: US 12,093,067 B1
(45) Date of Patent: Sep. 17, 2024

(54) LOW POWER CONSUMPTION AND HIGH PRECISION RESISTANCE-FREE CMOS REFERENCE VOLTAGE SOURCE

(71) Applicant: Hubei University Of Automotive Technology, Shiyan (CN)

(72) Inventors: Haibo Huang, Shiyan (CN); Fan Sun, Shiyan (CN); Jun Lu, Shiyan (CN); Jixiang Sui, Shiyan (CN); Shiqing Cheng, Shiyan (CN); Yi Zhao, Shiyan (CN); Yulin Kong, Shiyan (CN); Wenju Lv, Shiyan (CN); Shuo Cai, Shiyan (CN); Shiwei Xiao, Shiyan (CN); Huizhe Chen, Shiyan (CN); Zihan Lv, Shiyan (CN)

(73) Assignee: Hubei University Of Automotive Technology, Shiyan (CN)

( * ) Notice: Subject to any disclaimer, the term of this patent is extended or adjusted under 35 U.S.C. 154(b) by 0 days.

(21) Appl. No.: 18/648,440

(22) Filed: Apr. 28, 2024

(30) Foreign Application Priority Data

Jul. 28, 2023 (CN) ........................ 202310941651.X

(51) Int. Cl.
*G05F 1/567* (2006.01)
*G05F 1/46* (2006.01)
*G05F 3/26* (2006.01)

(52) U.S. Cl.
CPC .............. *G05F 1/567* (2013.01); *G05F 1/468* (2013.01); *G05F 3/26* (2013.01); *G05F 3/262* (2013.01)

(58) Field of Classification Search
CPC . G05F 1/567; G05F 1/468; G05F 3/26; G05F 3/262
See application file for complete search history.

(56) References Cited

U.S. PATENT DOCUMENTS

| | | | | |
|---|---|---|---|---|
| 6,677,808 | B1 * | 1/2004 | Sean | G05F 3/30 327/542 |
| 9,519,304 | B1 * | 12/2016 | Far | G05F 3/08 |
| 10,042,379 | B1 * | 8/2018 | Zhou | G05F 3/267 |
| 10,146,238 | B2 * | 12/2018 | Zhou | G05F 3/16 |
| 10,831,228 | B2 * | 11/2020 | Acar | G05F 3/267 |
| 2009/0108918 | A1 * | 4/2009 | Chellappa | G05F 3/30 327/539 |

(Continued)

FOREIGN PATENT DOCUMENTS

| | | | | |
|---|---|---|---|---|
| CN | 106527572 A | * 3/2017 | | G05F 1/46 |
| CN | 107272819 A | * 10/2017 | | G05F 3/26 |

(Continued)

*Primary Examiner* — Yusef A Ahmed
(74) *Attorney, Agent, or Firm* — Nitin Kaushik

(57) ABSTRACT

The invention discloses a low power consumption and high precision resistance-free CMOS reference voltage source circuit, which includes a, a positive temperature coefficient voltage generation circuit and a starting circuit. The self-bias current source circuit uses two NMOS tubes with different threshold voltages in the subthreshold region to form a stack structure, which generates the bias current and negative temperature coefficient voltage on the order of nanoampere. The positive temperature coefficient voltage generation circuit uses PMOS differential to generate positive temperature coefficient voltage for the structure and performs first-order curvature compensation for negative temperature coefficient voltage.

1 Claim, 3 Drawing Sheets

(56) References Cited

U.S. PATENT DOCUMENTS

| | | | | |
|---|---|---|---|---|
| 2010/0225384 | A1* | 9/2010 | Hirose | G05F 3/242 327/543 |
| 2011/0001546 | A1* | 1/2011 | Guo | G01K 3/005 327/512 |
| 2011/0043185 | A1* | 2/2011 | Kim | G05F 3/242 323/313 |
| 2013/0293215 | A1* | 11/2013 | Lym | G05F 3/30 323/313 |
| 2018/0164842 | A1* | 6/2018 | Zhou | G05F 3/16 |
| 2021/0356982 | A1* | 11/2021 | Cheng | G05F 1/468 |

FOREIGN PATENT DOCUMENTS

| | | | | | |
|---|---|---|---|---|---|
| CN | 107390757 | A | * | 11/2017 | G05F 1/56 |
| CN | 107861557 | A | | 3/2018 | |
| CN | 108205353 | A | * | 6/2018 | G05F 3/26 |
| CN | 109375688 | A | * | 2/2019 | G05F 1/465 |
| CN | 116931641 | A | | 10/2023 | |

* cited by examiner

LOW POWER CONSUMPTION AND HIGH PRECISION RESISTANCE-FREE CMOS REFERENCE VOLTAGE SOURCE

CROSS-REFERENCE TO RELATED APPLICATIONS

The application claims priority to Chinese patent application No. 202310941651X, filed on Jul. 28, 2023, the entire contents of which are incorporated herein by reference.

TECHNICAL FIELD

The present invention relates to the field of analogue integrated circuit, and particularly to a low power consumption and high precision resistance-free CMOS reference voltage source.

BACKGROUND

The reference voltage source can provide a reference voltage that does not vary with the process, power voltage and temperature (PVT) for analog to digital converter, phase-locked loop, comparator, linear voltage regulator and other digital to analog hybrid integrated circuit modules, and is widely used in wireless sensor networks, implantable biosensors, mobile portable devices and other electronic systems.

The traditional reference voltage source uses the base emitter voltage of bipolar transistor (BJT) as the negative temperature coefficient CTAT voltage, and the difference of the base emitter voltage of two BJT tube with different current density as the positive temperature coefficient PTAT voltage, and the two voltages are weighted together to produce a basically temperature-independent band gap voltage with zero temperature coefficient. However, due to the large on-voltage and high operating current of BJT tube, the power supply voltage and power consumption of traditional reference voltage source are larger. In addition, the traditional band-gap reference voltage source generally only carries out first-order temperature compensation, its temperature coefficient is large, and the precision of the reference voltage is poor. And the traditional reference voltage source generally uses resistance for the mutual conversion of voltage and current, in order to obtain the nanoampere level of current, it is necessary to use a resistance value of megohm level, which will greatly increase the area of the chip.

Through the above analysis, the problems and defects of the existing technology are as follows:

(1) The power supply voltage and power consumption of the traditional reference voltage source are larger.

(2) The traditional band-gap reference voltage source generally only performs first-order temperature compensation, which makes its temperature coefficient large, so the accuracy of the reference voltage is poor.

(3) Because the traditional reference voltage source usually uses a resistor to convert voltage and current to each other, in order to obtain a nanoampere level of current, a resistor with a resistance value of megohm level is needed, which greatly increases the area of the chip.

(4) Since the stability and accuracy of the reference voltage source are critical to many electronic systems, the above problems with traditional reference voltage sources can seriously affect the reliability and performance of these electronic systems.

SUMMARY

Aiming at the disadvantages of the traditional reference voltage source, such as large temperature coefficient, high power consumption and large chip area, the invention provides a resistance-free CMOS reference voltage source with low power consumption and high precision. The reference voltage source is designed by TSMC N12 nm CMOS technology, the circuit does not use resistor and BJT tube, and the chip area is small. All MOS tubes can operate in the sub-threshold region or cut-off region, which can greatly reduce power consumption and supply voltage. The NMOS tube working in the cut-off zone is used to generate an approximate exponential leakage current, and the high order curvature compensation is carried out to further reduce the temperature coefficient of the reference voltage source. In addition, the PTAT voltage and CTAT voltage of the invention are the gate-source voltage difference of the MOS tube, and the process stability is high, overcoming the problem of poor process stability of the general sub-threshold CMOS reference source.

The invention provides a low power consumption and high precision resistance-free CMOS reference voltage source, which consists of three parts: a starting circuit, a self-bias current source circuit and a positive temperature coefficient voltage generation circuit.

The function of the starting circuit is to make the reference voltage source circuit out of the zero state operating point and enter the normal working state; The self-bias current source circuit generates a current of nanoampere magnitude, provides a bias current to a positive temperature coefficient voltage generation circuit, and outputs a negative temperature coefficient voltage $V_{CTAT}$; The positive temperature coefficient voltage generation circuit generates a positive temperature coefficient voltage $V_{PTAT}$, compensates the negative temperature coefficient voltage generated by the self-bias current source, and uses the leakage current of the NMOS tube working in the cut-off zone to carry out high-order curvature compensation, and outputs the reference voltage $V_{REF}$ which is basically independent of temperature.

Further, the self-bias current source circuit comprises a second PMOS tube MP2, a third PMOS tube MP3, a third NMOS tube MN3, a fourth NMOS tube MN4 and a fifth NMOS tube MN5, and the fifth NMOS tube MN5 is a thick gate NMOS tube with high threshold value, while the others are MOS tubes with low threshold value.

The source of the second PMOS tube MP2 and the third PMOS tube MP3 are connected to the power supply voltage, and the gate and drain of the second PMOS tube MP2 are shorted and connected to the gate of the third PMOS tube MP3 and the drain of the third NMOS tube MN3.

The gate and drain of the fourth NMOS tube MN4 are short-connected and connected to the drain of the third PMOS tube MP3 and the gate of the fifth NMOS tube MN5, and the source is connected to the drain of the fifth NMOS tube MN5.

The source of the fifth NMOS tube MN5 is grounded, the drain is connected to the gate of the third NMOS tube MN3 and the source of the fourth NMOS tube MN4, and the negative temperature coefficient voltage $V_{CTAT}$ is output from the drain of the fifth NMOS tube MN5.

Further, the negative temperature coefficient voltage $V_{CTAT}$ is specifically:

$$V_{CTAT}=V_{GSN5}-V_{GSN4} \quad (1)$$

Wherein, $V_{GSN4}$ and $V_{GSN5}$ are the gate-source voltages of the fourth NMOS tube MN4 and the fifth NMOS tube MN5, respectively.

The fourth NMOS tube MN4 and the fifth NMOS tube MN5 both work in the sub-threshold region, and the drain current $I_D$ of the MOS tube operating in the sub-threshold region is an exponential function of gate source voltage $V_{GS}$ and drain-source voltage $V_{DS}$, whose expression is as follows:

$$I_D = KI_0\exp\left(\frac{V_{GS}-V_{TH}}{\eta V_T}\right)\times\left[1-\exp\left(-\frac{V_{DS}}{V_T}\right)\right] \tag{2}$$

Wherein, K is the width to length ratio of MOS tube; $I_0=\mu C_{OX}(\eta-1)V_T^2$, $\mu$ is electron mobility, $C_{OX}$ is gate oxide capacitance per unit area, q is the subthreshold slope of the MOS tube. $V_T=k_BT/q$ is the thermal voltage, $k_B$ is the Boltzmann constant and T is the absolute temperature.

When the drain-to-source voltage VDS meets VDS≥4VT, the drain current $I_D$ of the MOS tube is basically independent of $V_{DS}$, and its expression is as follows:

$$I_D = KI_0\exp\left(\frac{V_{GS}-V_{TH}}{\eta V_T}\right) \tag{3}$$

From formula (3), the gate-source voltage $V_{GS}$ of MOS tube can be obtained as follows:

$$V_{GS} = V_{TH} + \eta V_T\ln\left[\frac{I_D}{\mu C_{OX}K(\eta-1)V_T^2}\right] \tag{4}$$

According to formula (4), the gate-source voltages $V_{GSN4}$ and $V_{GSN5}$ of the fourth NMOS tube MN4 and the fifth NMOS tube MN5 can be obtained as follows:

$$V_{GSN4} = V_{TH1} + \eta_1 V_T\ln\left[\frac{I_{DN4}}{\mu_N C_{OX}K_{N4}(\eta_1-1)V_T^2}\right] \tag{5}$$

$$V_{GSN5} = V_{TH2} + \eta_2 V_T\ln\left[\frac{I_{DN4}}{\mu_N C_{OX}K_{N5}(\eta_2-1)V_T^2}\right] \tag{6}$$

Wherein, $\eta_1$ and $\eta_2$ are the sub-threshold slopes of the MN4 and MN5 tubes, respectively, and $\eta_1 \neq \eta_2 = \eta_N$, satisfying $1<\eta N<3$. $\mu_N$ is the electron mobility of NMOS tube. $K_{N4}$ and $K_{N5}$ are the width-length ratio of MN4 and MN5 tubes, respectively, $I_{DN4}$ is the drain current flowing through MN4 and MN5 tubes.

The negative temperature coefficient voltage $V_{CTAT}$ can be further obtained as:

$$V_{CTAT} = V_{TH2} - V_{TH1} + \eta_N\frac{k_BT}{q}\ln\frac{K_{N4}}{K_{N5}} \tag{7}$$

Wherein, $V_{TH1}$ is the threshold voltage of the fourth NMOS tube MN4, and $V_{TH2}$ is the threshold voltage of the fifth NMOS tube MN5. The threshold voltage of an NMOS tube can be approximated as a first-order function of temperature, then $V_{TH1}$ and $V_{TH2}$ can be expressed as:

$$V_{TH1}=V_{TH10}+k_{t1}(T-T_0) \tag{8}$$

$$V_{TH2}=V_{TH20}+k_{t2}(T-T_0) \tag{9}$$

Wherein T is the absolute temperature; To is the absolute temperature of the reference point. $V_{TH10}$ and $V_{TH20}$ are the threshold voltages of MN4 tube and MN5 tube at TO temperature respectively. $k_{t1}$ and $k_{t2}$ are the first-order temperature coefficients of $V_{TH1}$ and $V_{TH2}$, respectively. In the TSMC N12 nm CMOS process adopted by the invention, the threshold voltage $V_{TH1}$ of the low threshold NMOS tube MN4 is about 326 mV at room temperature (27° C.), and the first-order temperature coefficient $k_{t1}$ is about −0.224 mV/° C. The threshold voltage $V_{TH2}$ of the high-threshold NMOS tube MN5 is about 527 mV at room temperature, and the first-order temperature coefficient $k_{t2}$ is about −0.334 mV/° C.

Then the expression of the negative temperature coefficient voltage $V_{CTAT}$ can be obtained as follows:

$$V_{CTAT} = (k_{t2}-k_{t1})T + \eta_N\frac{k_BT}{q}\ln\frac{K_{N4}}{K_{N5}} + (k_{t1}-k_{t2})T_0 + V_{TH20} - V_{TH10} \tag{10}$$

In formula (10), since $(k_{t2}-k_{t1})$ is <0, and appropriate MN4 and MN5 tube sizes are selected at the same time, so that $(K_{N4}/K_{N5})$ is <1, then $V_{CTAT}$ approximately decreases linearly with increasing temperature.

Further, the starting circuit comprises a first PMOS tube MP1, a first NMOS tube MN1 and a second NMOS tube MN2, all of which adopt a low threshold MOS tube.

The drain and source of the first PMOS tube MP1 are connected to the power supply voltage, and the gate is connected to the drain of the second NMOS tube MN2 and the gate of the first NMOS tube MN1. The gate of the second NMOS tube MN2 is connected to the gate of the third NMOS tube MN3 and the drain of the fifth NMOS tube MN5. The drain of the first NMOS tube MN1 is connected to the gate of the second PMOS tube MP2, and the source of the first NMOS tube MN1 and the second NMOS tube MN2 are grounded.

Further, the positive temperature coefficient voltage generation circuit comprises a fourth PMOS tube MP4, a fifth PMOS tube MP5, a sixth PMOS tube MP6, a sixth NMOS tube MN6, a seventh NMOS tube MN7 and an eighth NMOS tube MN8, all of which adopt a low threshold MOS tube.

The gate of the fourth PMOS tube MP4 is connected to the gate of the second PMOS tube MP2, and the drain is connected to the source of the fifth PMOS tube MP5 and the sixth PMOS tube MP6, and the source is connected to the power supply voltage.

The source of the fifth PMOS tube MP5 is connected to the source of the sixth PMOS tube MP6 and the drain of the fourth PMOS tube MP4, and the gate is connected to the drain of the fifth NMOS tube MN5, and the drain is connected to the drain of the sixth NMOS tube MN6.

The source of the sixth PMOS tube MP6 is connected to the drain of the fourth PMOS tube MP4, and the gate and drain of the sixth PMOS tube are short-cut and connected to the drain of the seventh NMOS tube MN7, and the reference voltage $V_{REF}$ is output from the drain of the sixth PMOS tube MP6.

The gate and drain of the sixth NMOS tube MN6 are shorted and connected to the drain of the fifth PMOS tube MP5 and the gate of the seventh NMOS tube MN7, and the source is grounded; The drain of the seventh NMOS tube MN7 is connected to the drain of the sixth PMOS tube MP6, and its source is grounded; The gate and source of the eighth NMOS tube MN8 are grounded, and its drain is connected to the drain of the sixth NMOS tube MN6.

Further, the PTAT voltage generation circuit contains a fourth PMOS tube MP4, a fifth PMOS tube MP5, a sixth PMOS tube MP6, a sixth NMOS tube MN6, a seventh NMOS tube MN7 and an eighth NMOS tube MN8. The grid of the fourth PMOS tube MP4 is connected to the grid of the third PMOS tube MP3, the drain of the fourth PMOS tube MP4 is connected to the source of the fifth PMOS tube MP5 and the sixth PMOS tube MP6, and the source of the fourth PMOS tube MP4 is connected to the power supply voltage. The source electrode of the fifth PMOS tube MP5 is connected to the source electrode of the sixth PMOS tube MP6, the gate electrode of the fifth PMOS tube MP5 is connected to the drain electrode of the fifth NMOS tube MN5, and the drain electrode of the fifth PMOS tube MP5 is connected to the drain electrode of the sixth NMOS tube MN6. The source pole of the sixth PMOS tube MP6 is connected to the source pole of the fifth PMOS tube MP5, and the gate and drain of the sixth PMOS tube MP6 are shorted and connected to the drain pole of the seventh NMOS tube MN7. The gate and drain of the sixth NMOS tube MN6 are shorted and connected to the gate of the seventh NMOS tube; The drain of the eighth NMOS tube MN8 is connected to the drain of the sixth NMOS tube MN6, and the grid of the eighth NMOS tube MN8 is grounded. The source of the sixth NMOS tube MN6, the seventh NMOS tube MN7 and the eighth NMOS tube MN8 are all grounded.

Further, the fifth PMOS tube MP5 and the sixth PMOS tube MP6 are differential pairs of different sizes, and the fourth PMOS tube MP4 provides bias current; The sixth NMOS tube MN6 and the seventh NMOS tube MN7 are current mirror loads and have the same size. Then the PTAT voltage is the difference between the gate source voltage of MP5 tube and MP6 tube, which can be expressed as:

$$V_{PTAT}=V_{SGP5}-V_{SGP6} \tag{11}$$

The fifth PMOS tube MP5 and the sixth PMOS tube MP6 are both low-threshold PMOS tubes and operate in the sub-threshold region, so the gate-source voltages $V_{SGP5}$ and $V_{SGP6}$ of MP5 and MP6 are:

$$V_{SGP5} = V_{THP} + \eta_P V_T \ln\left[\frac{I_{DP5}}{\mu_P C_{OX} K_{P5}(\eta_P - 1)V_T^2}\right] \tag{12}$$

$$V_{SGP6} = V_{THP} + \eta_P V_T \ln\left[\frac{I_{DP6}}{\mu_P C_{OX} K_{P6}(\eta_P - 1)V_T^2}\right] \tag{13}$$

Wherein, $\eta_P$ is the sub-threshold slope of a low-threshold PMOS tube; $K_{P5}$ and $K_{P6}$ are the width-length ratio of the fifth PMOS tube MP5 and the sixth PMOS tube MP6, respectively. $I_{DP5}$ and $I_{DP6}$ are drain currents of MP5 and MP6 tubes, respectively.

Then the positive temperature coefficient voltage $V_{PTAT}$ can be further expressed as:

$$V_{PTAT} = \frac{\eta_P k_B T}{q}\ln\left(\frac{K_{P6}I_{DP5}}{K_{P5}I_{DP6}}\right) \tag{14}$$

The circuit structure adopts the form of self-bias current source and PTAT voltage generation circuit cascade, then the output reference voltage is:

$$V_{REF}=V_{CTAT}+V_{PTAT} \tag{15}$$

When the leakage current $I_{DP5}$ of MP5 is equal to the leakage current $I_{DP6}$ of MP6, $V_{PTAT}$ is proportional to the absolute temperature. By selecting appropriate $K_{P5}$ and $K_{P6}$, the positive primary term coefficient of temperature of $V_{PTAT}$ can completely offset the negative primary term temperature coefficient of temperature of $V_{CTAT}$, so that $V_{REF}$ is independent of temperature.

Further, in the low power consumption and high precision resistance-free CMOS reference voltage source circuit, the fifth NMOS tube MN5 is the high threshold NMOS tube nch_18_mac. The first PMOS tube MP1, the second PMOS tube MP2, the third PMOS tube MP3, the fourth PMOS tube MP4, the fifth PMOS tube MP5 and the sixth PMOS tube MP6 are all low-threshold PMOS tubes pch_lvt_mac. The first NMOS tube MN1, the second NMOS tube MN2, the third NMOS tube MN3, the fourth NMOS tube MN4, the sixth NMOS tube MN6, the seventh NMOS tube MN7 and the eighth NMOS tube MN8 are all low-threshold NMOS tubes nch_lvt_mac.

Further, the self-bias current source circuit generates a negative temperature coefficient voltage $V_{CTAT}$; The positive temperature coefficient voltage generation circuit generates the positive temperature coefficient voltage $V_{PTAT}$ to compensate the first order curvature of $V_{CTAT}$ and cancel the first order temperature term. The grid and source of the eighth NMOS tube MN8 are grounded and work in the cut-off area. By using the characteristics that the leakage current changes approximately exponentially with the increase of temperature, the reference voltage is compensated with high order curvature to improve the accuracy of the reference voltage source.

Further, the leakage current $I_{DN6}$ of the sixth NMOS tube MN6 and the leakage current $I_{DN7}$ of the seventh NMOS tube MN7 are respectively:

$$I_{DN6} = K_{N6}I_0\exp\left(\frac{V_{GSN6} - V_{TH1}}{\eta_N V_T}\right)\times\left[1 - \exp\left(-\frac{V_{GSN6}}{V_T}\right)\right] \tag{16}$$

$$I_{DN7} = K_{N7}I_0\exp\left(\frac{V_{GSN6} - V_{TH1}}{\eta_N V_T}\right) \tag{17}$$

When the influence of MN8 tube is not considered, the ratio of MP5 leakage current $I_{DP5}$ to MP6 leakage current $I_{DP6}$ is as follows:

$$\frac{I_{DP5}}{I_{DP6}} = \frac{I_{DN6}}{I_{DN7}} = 1 - \exp\left(-\frac{V_{GSN6}}{V_T}\right) \tag{18}$$

Since $V_{GSN6}$ gradually decreases with the increase of temperature, assuming that $V_{GSN6}=4V_T$ is satisfied when the temperature is T=T1, when T<T1, $V_{GSN6}$>4VT, the exponential term in equation (18) is about 0, at this time $I_{DP5}$ and $I_{DP6}$ are basically equal, $V_{PTAT}$ voltage is proportional to absolute temperature and is a primary function of temperature. When T>T1, $V_{GSN6}<4V_T$, and the exponential term in equation (18) is greater than zero, and gradually increases with the increase of temperature. Therefore, in the high temperature segment, the current ratio of $I_{DP5}$ and $I_{DP6}$ gradually decreases with the increase of temperature, and the first-order temperature coefficient of $V_{PTAT}$ decreases, and the exponential function will introduce the higher-order term of temperature, so that the precision of the reference source becomes worse.

In the present invention, in order to eliminate the nonlinear term introduced by the current difference of $I_{DP5}$ and $I_{DP6}$, the leakage current of MN8 tube operating in the cut-off zone is used to compensate the current difference value. When the gate and source of the MN8 tube are grounded, it works in the cutoff region, but the leakage current of the MN8 tube is not zero and cannot be ignored, and can still be described by the current expression of the sub-threshold region. The width to length ratio of MN8 tube is $K_{N8}$, and the leakage current of MN8 tube with gate-source grounding can be expressed as:

$$I_{DN8} = K_{N8} I_0 \exp\left(-\frac{V_{TH1}}{\eta_N V_T}\right)\left[1 - \exp\left(\frac{V_{GSN6}}{V_T}\right)\right] \tag{19}$$

When the leakage current of the eighth NMOS tube MN8 is considered, the current flowing through the fifth PMOS tube MP5 is the sum of $I_{DN6}$ and $I_{DN8}$. The current flowing through the sixth PMOS tube MP6 is the same as $I_{DN7}$. It can be obtained that the ratio of MP5 leakage current $I_{DP5}$ to MP6 leakage current $I_{DP6}$ at this time is:

$$\frac{I_{DP5}}{I_{DP6}} = 1 - \exp\left(-\frac{V_{GSN6}}{V_T}\right) + \frac{K_{N8}}{K_{N6}}\exp\left(-\frac{V_{GSN6}}{\eta_N V_T}\right) - \frac{K_{N8}}{K_{N6}}\exp\left(-\frac{V_{GSN6}}{V_T} - \frac{V_{GSN6}}{\eta_N V_T}\right) \tag{20}$$

In equation (20), the sub-threshold slope of NMOS tube $\eta_N$ is a process-related parameter, generally around 1.5. The third index item has less impact than the first two index items and can be ignored in the analysis. Because the symbols of the first exponential term and the second exponential term are opposite, the higher order terms of temperature in $V_{PTAT}$ can be reduced or even offset by selecting the appropriate width to length ratio $K_{N8}$ of MN8 tube and the width to length ratio $K_{N6}$ of the sixth NMOS tube MN6, thereby reducing the temperature coefficient of the reference voltage source and obtaining the reference voltage $V_{REF}$, which is basically temperature-independent.

In the invention, by adjusting the width to length ratio of the fourth NMOS tube $K_{N4}$, the width to length ratio of the fifth NMOS tube $K_{N5}$, the width to length ratio of the fifth PMOS tube $K_{P5}$ and the width to length ratio of the sixth PMOS tube $K_{P6}$, the primary term of temperature in the reference voltage $V_{REF}$ can be offset. At the same time, by adjusting the width to length ratio of the eighth NMOS tube $K_{N8}$ and the width to length ratio of the sixth NMOS tube $K_{N6}$, the secondary temperature term of $V_{REF}$ can be offset and the higher order temperature term can be reduced to carry out high-order curvature compensation and improve the accuracy of the reference source.

Combined with the above technical scheme and solved technical problems, the technical scheme to be protected by the invention has the advantages and positive effects as follows:

First, in view of the technical problems existing in the above existing technology and the difficulty of solving the problem, some creative technical effects are brought about after solving the problem. The specific description is as follows:

(1) The reference voltage source of the invention does not adopt a resistor and BJT tube, but is all composed of MOS tubes, and the MOS tubes all work in the sub-threshold region or cut-off region, and can obtain lower power supply voltage and power consumption compared with the traditional band gap reference voltage source;

The simulation results of the reference voltage source of the invention show that in the temperature range of −40° C.~125° C., the power supply voltage range of the reference voltage source can work normally is 0.45V-1.2V. When the power supply voltage is 0.45V, the current consumed by the voltage reference source is 8.2 nA and the power consumption is 3.7 nW at room temperature (27° C.).

(2) NMOS operating in the cut-off zone generates leakage current that changes approximately exponentially with the increase of temperature, and performs high-order curvature compensation on the reference voltage to obtain a lower temperature coefficient. The compensation circuit is simple in structure and does not significantly increase the power consumption of the circuit;

In the temperature range of −40° C.~125° C., when the power supply voltage $V_{DD}$ takes different values, the relationship curve between the reference voltage $V_{REF}$ and temperature is simulated. The output voltage $V_{REF}$ of the reference voltage source is about 234.5 mV When the $V_{DD}$ is 0.45V, 0.7V, 1V and 1.2V, the $V_{REF}$ changes by 0.22 mV, 0.20 mV, 0.19 mV and 0.39 mV respectively, and the temperature coefficients are 5.7 ppm/° C., 5.2 ppm/° C., 4.9 ppm/° C. and 10.1 ppm/° C., respectively.

(3) The invention adopts more advanced process design and achieves better performance in power consumption, precision, chip area and other indicators. This design circuit does not use resistance and BJT tube, and adopts more advanced TSMC N12 nm CMOS process, the layout area is small, only about 35 μm×18 μm.

Second, taking the technical scheme as a whole or from the perspective of the product, the technical scheme to be protected by the invention has technical effects and advantages, which are described as follows:

The low power consumption and high precision resistance-free CMOS reference voltage source of the invention can be applied to wireless sensor network nodes, implantable biosensors, mobile portable devices and other electronic systems. The invention designs an all CMOS reference voltage source without resistance and BJT tube based on high order curvature compensation technology. CTAT voltage is generated by stacking the common grid of MOS tubes with two different thresholds in the sub-threshold region. The PTAT voltage is generated by the non-equilibrium difference which also works in the sub-threshold region to offset the first order temperature coefficient of the CTAT voltage and generate the reference voltage $V_{REF}$. The MOS tube working in the cut-off zone generates exponential leakage current, and the nonlinear term of $V_{REF}$ in the high temperature section is compensated by high order curvature, and the precision of reference voltage is improved. The reference voltage source of the invention has the advantages of low power consumption, high precision and small area. The reference voltage source of the invention can work under the power supply voltage of 0.45-1.2V, and the output average value is 234.5 mV reference voltage. When the power supply voltage is 0.45V and the temperature range is −40~125° C., the temperature coefficient of the reference voltage is 5.7 ppm/° C. The power consumption at room temperature is 3.7 nW and the power supply rejection ratio PSRR at 1 kHz is −59.7 dB. The invention adopts a relatively advanced technological process, and the area of the layout is small, only 35 μm×18 μm.

Third, aiming at the problem that the traditional reference voltage source has high power consumption and poor precision, the invention designs an all CMOS reference voltage source without resistance and BJT tube based on the high order curvature compensation technology. The design of resistance-free all CMOS reference voltage source using MOS tube operating in the sub-threshold region can effectively reduce the power supply voltage, power consumption and chip area. The exponential leakage current of MOS tube working in the cut-off zone is used for high order curvature compensation to improve the precision of reference source. Excellent performance is obtained in power consumption, precision and chip area. The designed reference voltage source can work under the supply voltage of 0.45-1.2V, and the average output is 234.5 mV reference voltage. When the power supply voltage is 0.45V and the temperature range is −40~125° C., the temperature coefficient of the reference voltage is 5.7 ppm/° C. Power consumption at room temperature (27° C.) is 3.7 nW. The chip area of the designed reference voltage source is about 35 μm×18 μm. It has great application prospects in implantable and wearable medical devices, wireless sensor network nodes and other electronic systems that require high low power consumption.

DETAILED DESCRIPTION OF THE EMBODIMENTS

In order to make the purpose, technical scheme and advantages of the invention more clearly understood, the invention is further explained in the following embodiment. It should be understood that the specific embodiment described herein are intended only to explain the invention and are not intended to qualify it.

Figure 1:
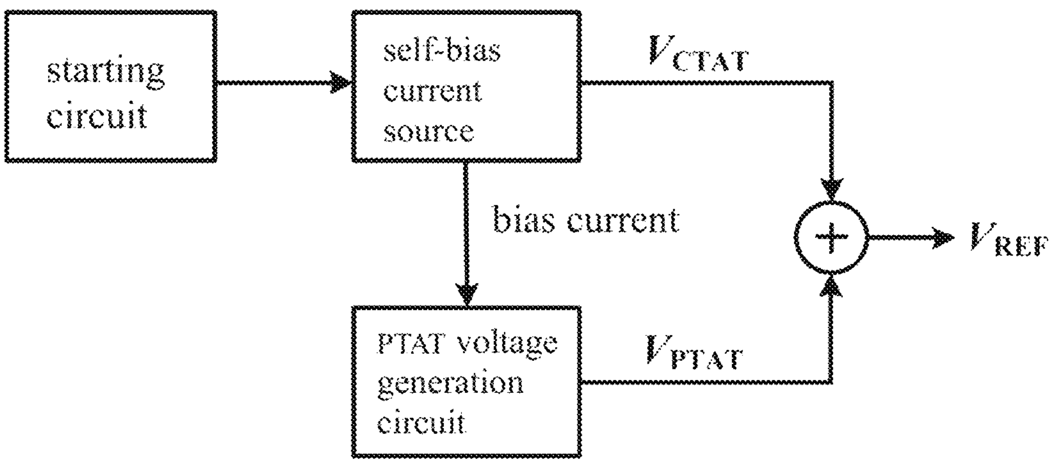
FIG. 1 is a circuit structure block diagram of a low-power, high-precision, resistance-free CMOS reference voltage source provided by the invention.

As shown in FIG. 1, the invention provides a low power consumption and high precision resistance-free CMOS reference voltage source circuit structure block diagram, including three parts: starting circuit, self-bias current source circuit and PTAT voltage generation circuit.

The role of the starting circuit is to make the circuit out of the zero state operating point and enter the normal working state when the power supply is powered on. The function of the self-bias current source circuit is to provide the bias current to the PTAT voltage generating circuit and to generate the negative temperature coefficient voltage $V_{CTAT}$. The function of the PTAT voltage generation circuit is to generate a positive temperature coefficient voltage $V_{PTAT}$ to compensate for $V_{CTAT}$, and output a temperature-independent reference voltage $V_{REF}$.

Figure 2:
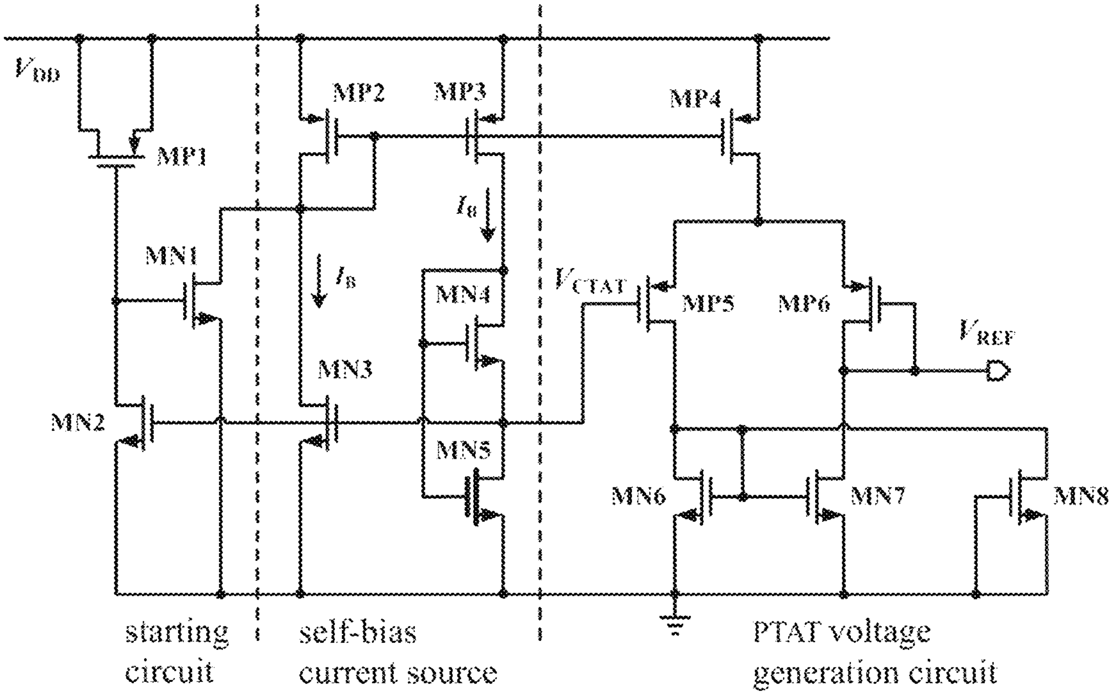
FIG. 2 is a circuit schematic diagram of a low-power, high-precision, resistance-free CMOS reference voltage source provided by the invention.

As shown in FIG. 2, the invention provides a circuit schematic diagram of a low power consumption, high precision and no resistance type CMOS reference voltage source.

The starting circuit consists of the first PMOS tube MP1, the first NMOS tube MN1 and the second NMOS tube MN2.

At the moment when the power supply is powered on, the power supply charges the capacitor formed by the first PMOS tube MP1, so that the gate voltage of the first NMOS tube MN1 increases rapidly, prompting the first NMOS tube MN1 to be switched on, pulling down the gate voltage of the second PMOS tube MP2 and the third PMOS tube MP3, and injecting instantaneous large current into the circuit. Make the circuit out of the zero state degeneracy point and enter the normal working state. When the circuit is working normally, the negative temperature coefficient voltage $V_{CTAT}$ makes the second NMOS tube MN2 tube open, and pulls down the gate voltage of the first NMOS tube MN1, making the first NMOS tube MN1 close and exit the startup process. The starting circuit does not consume static current and does not affect the normal working state of the reference source circuit.

The self-bias current source circuit is composed of the second PMOS tube MP2, the third PMOS tube MP3, the third NMOS tube MN3, the fourth NMOS tube MN4 and the fifth NMOS tube MN5.

The grid and source of the fourth NMOS tube MN4 are short-connected, and the fifth NMOS tube and the fourth NMOS tube MN4 are low-threshold NMOS tubes, and the fifth NMOS tubes are high-threshold NMOS tubes. The negative temperature coefficient voltage $V_{CTAT}$ is output from the drain of the fifth NMOS tube, then it can get:

$$V_{CTAT}=V_{GSN5}-V_{GSN4} \tag{1}$$

Wherein, $V_{GSN4}$ and $V_{GSN5}$ are the gate-source voltages of the fourth NMOS tube MN4 and the fifth NMOS tube MN5, respectively.

The fourth NMOS tube MN4 and the fifth NMOS tube MN5 both work in the sub-threshold region, and the drain current $I_D$ of the MOS tube operating in the sub-threshold region is an exponential function of gate source voltage $V_{GS}$ and drain-source voltage $V_{DS}$, whose expression is as follows:

$$I_D = KI_0\exp\left(\frac{V_{GS}-V_{TH}}{\eta V_T}\right)\times\left[1-\exp\left(-\frac{V_{DS}}{V_T}\right)\right] \tag{2}$$

Wherein, K is the width to length ratio of MOS tube; $I_0=\mu C_{ox}(\eta-1)V_T^2$, μ is electron mobility, $C_{OX}$ is gate oxide capacitance per unit area, q is the subthreshold slope of the MOS tube. $V_T=k_BT/q$ is the thermal voltage, $k_B$ is the Boltzmann constant and T is the absolute temperature.

When the drain-to-source voltage VDS meets VDS≥4VT, the drain current ID of the MOS tube is basically independent of VDS, and its expression is as follows:

$$I_D = KI_0\exp\left(\frac{V_{GS}-V_{TH}}{\eta V_T}\right) \tag{3}$$

From formula (3), the gate-source voltage $V_{GS}$ of MOS tube can be obtained as follows:

$$V_{GS} = V_{TH} + \eta V_T\ln\left[\frac{I_D}{\mu C_{OX}K(\eta-1)V_T^2}\right] \tag{4}$$

According to formula (4), the gate-source voltages $V_{GSN4}$ and $V_{GSN5}$ of the fourth NMOS tube MN4 and the fifth NMOS tube MN5 can be obtained as follows:

$$V_{GSN4} = V_{TH1} + \eta_1 V_T \ln\left[\frac{I_{DN4}}{\mu_N C_{OX} K_{N4}(\eta_1 - 1)V_T^2}\right] \quad (5)$$

$$V_{GSN5} = V_{TH2} + \eta_2 V_T \ln\left[\frac{I_{DN4}}{\mu_N C_{OX} K_{N5}(\eta_2 - 1)V_T^2}\right] \quad (6)$$

Wherein, $\eta_1$ and $\eta_2$ are the sub-threshold slopes of the MN4 and MN5 tubes, respectively, and $\eta_1=\eta_2=\eta N$, satisfying $1<\eta_N<3$. $\mu_N$ is the electron mobility of NMOS tube. $K_{N4}$ and $K_{N5}$ are the width-length ratio of MN4 and MN5 tubes, respectively, $I_{DN4}$ is the drain current flowing through MN4 and MN5 tubes.

The negative temperature coefficient voltage $V_{CTAT}$ can be further obtained as:

$$V_{CTAT} = V_{TH2} - V_{TH1} + \eta_N \frac{k_B T}{q} \ln\frac{K_{N4}}{K_{N5}} \quad (7)$$

Wherein, $V_{TH1}$ is the threshold voltage of the fourth NMOS tube MN4, and $V_{TH2}$ is the threshold voltage of the fifth NMOS tube MN5. The threshold voltage of an NMOS tube can be approximated as a first-order function of temperature, then $V_{TH1}$ and $V_{TH2}$ can be expressed as:

$$V_{TH1}=V_{TH10}+k_{t1}(T-T_0) \quad (8)$$

$$V_{TH2}=V_{TH20}+k_{t2}(T-T_0) \quad (9)$$

Where T is the absolute temperature; To is the absolute temperature of the reference point. $V_{TH10}$ and $V_{TH20}$ are the threshold voltages of MN4 tube and MN5 tube at $T_0$ temperature respectively. $k_{t1}$ and $k_{t2}$ are the first-order temperature coefficients of $V_{TH1}$ and $V_{TH2}$, respectively. In the TSMC N12 nm CMOS process adopted by the invention, the threshold voltage $V_{TH1}$ of the low threshold NMOS tube MN4 is about 326 mV at room temperature (27° C.), and the first-order temperature coefficient $k_{t1}$ is about −0.224 mV/° C. The threshold voltage $V_{TH2}$ of the high-threshold NMOS tube MN5 is about 527 mV at room temperature, and the first-order temperature coefficient $k_{t2}$ is about −0.334 mV/° C.

Then the expression of the negative temperature coefficient voltage $V_{CTAT}$ can be obtained as follows:

$$V_{CTAT} = (k_{t2} - k_{t1})T + \eta_N \frac{k_B T}{q} \ln\frac{K_{N4}}{K_{N5}} + (k_{t1} - k_{t2})T_0 + V_{TH20} - V_{TH10} \quad (10)$$

In formula (10), since $(k_{t2}-k_{t1})$ is <0, and appropriate MN4 and MN5 tube sizes are selected at the same time, so that $(K_{N4}/K_{N5})$ is <1, then $V_{CTAT}$ approximately decreases linearly with increasing temperature.

The positive temperature coefficient voltage generation circuit is composed of the fourth PMOS tube MP4, the fifth PMOS tube MP5, the sixth PMOS tube MP6, the sixth NMOS tube MN6, the seventh NMOS tube MN7 and the eighth NMOS tube MN8.

The grid of the fourth PMOS tube MP4 is connected to the grid of the second PMOS tube MP2, the drain of the MP4 is connected to the source of the fifth PMOS tube MP5 and the sixth PMOS tube MP6, and the source of the MP4 is connected to the power supply voltage. The source pole of the fifth PMOS tube MP5 and the sixth PMOS tube MP6 are connected together to form a differential pair structure. The gate of MP5 is connected to the drain of the fifth NMOS tube MN5, and the drain of MP5 is connected to the drain of the sixth NMOS tube MN6. The gate and drain of the sixth PMOS tube MP6 are shorted, the reference voltage $V_{REF}$ is output from the gate, and connected to the drain of the seventh NMOS tube MN7; The gate and drain of the sixth NMOS tube MN6 are shorted and connected to the gate of the seventh NMOS tube MN7; The drain of the seventh NMOS tube MN7 is connected to the drain of the sixth PMOS tube MP6, and the gate of MN7 is connected to the gate of MN6. The drain of the eighth NMOS tube MN8 is connected to the drain of the sixth NMOS tube MN6, and the gate and source of MN8 are grounded. The source of the sixth NMOS tube MN6, the seventh NMOS tube MN7 and the eighth NMOS tube MN8 are all grounded.

In the invention, the fifth PMOS tube MP5 and the sixth PMOS tube MP6 are differential pairs of different sizes, and the fourth PMOS tube MP4 provides bias current; The sixth NMOS tube MN6 and the seventh NMOS tube MN7 are current mirror loads and have the same size. Then the PTAT voltage is the difference between the gate source voltage of MP5 tube and MP6 tube, which can be expressed as:

$$V_{PTAT}=V_{SGP5}V_{SGP6} \quad (11)$$

The fifth PMOS tube MP5 and the sixth PMOS tube MP6 are both low-threshold PMOS tubes and operate in the sub-threshold region, so the gate-source voltages $V_{SGP5}$ and $V_{SGP6}$ of MP5 and MP6 are:

$$V_{SPG5} = V_{THP} + \eta_P V_T \ln\left[\frac{I_{DP5}}{\mu_P C_{OX} K_{P5}(\eta_P - 1)V_T^2}\right] \quad (12)$$

$$V_{SPG6} = V_{THP} + \eta_P V_T \ln\left[\frac{I_{DP6}}{\mu_P C_{OX} K_{P6}(\eta_P - 1)V_T^2}\right] \quad (13)$$

Where, $\eta_P$ is the sub-threshold slope of a low-threshold PMOS tube; $K_{P5}$ and $K_{P6}$ are the width-length ratio of the fifth PMOS tube MP5 and the sixth PMOS tube MP6, respectively. $I_{DP5}$ and $I_{DP6}$ are drain currents of MP5 and MP6 tubes, respectively.

Then the positive temperature coefficient voltage $V_{PTAT}$ can be further expressed as:

$$V_{PTAT} = \frac{\eta_P k_B T}{q} \ln\left(\frac{K_{P6} I_{DP5}}{K_{P5} I_{DP6}}\right) \quad (14)$$

The circuit structure of the invention adopts the form of self-bias current source and PTAT voltage generation circuit cascade, and the output reference voltage is:

$$V_{REF}=V_{CTAT}+V_{PTAT} \quad (15)$$

When the leakage current $I_{DP5}$ of MP5 is equal to the leakage current $I_{DP6}$ of MP6, $V_{PTAT}$ is proportional to the absolute temperature. By selecting appropriate $K_{P5}$ and $K_{P6}$, the positive primary term coefficient of temperature of $V_{PTAT}$ can completely offset the negative primary term temperature coefficient of temperature of $V_{CTAT}$, so that $V_{REF}$ is independent of temperature.

However, the actual situation is that when the influence of the eighth NMOS tube MN8 is not considered, the drain and source voltages of the sixth NMOS tube MN6 and the seventh NMOS tube MN7 are not equal, resulting in unequal leakage currents of MN6 and MN7 tubes, thus making the leakage current $I_{DP5}$ of MP5 and $I_{DP6}$ of MP6 unequal. The $V_{PTAT}$ contains the higher order term of temperature, and the temperature coefficient of $V_{REF}$ increases, and the accuracy becomes worse.

Within the operating temperature range of the reference source of the invention (−40~125° C.), the thermal voltage VT ranges from 20-34 mV, the drain-source voltage VGSN6 of the sixth NMOS tube MN6 ranges from 150-80 mV, and the drain-source voltage of the seventh NMOS tube MN7 tube, namely the reference voltage value $V_{REF}$, is about 234 mV. It can be seen that $V_{REF}$24VT is satisfied in the whole temperature range, so the drain current $I_{DN7}$ of MN7 tube is basically independent of the drain-source voltage. When $V_{GSN6}$≥4VT is satisfied in the low temperature section, the drain current $I_{DN6}$ of MN6 tube is basically independent of the drain-source voltage. In the high temperature section, $V_{GSN6}$<4VT, so $I_{DN6}$ is related to drain-source voltage.

The leakage current $I_{DN6}$ of the sixth NMOS tube MN6 and the leakage current $I_{DN7}$ of the seventh NMOS tube MN7 are:

$$I_{DN6} = K_{N6} I_0 \exp\left(\frac{V_{GSN6} - V_{TH1}}{\eta_N V_T}\right) \times \left[1 - \exp\left(-\frac{V_{GSN6}}{V_T}\right)\right] \tag{16}$$

$$I_{DN7} = K_{N7} I_0 \exp\left(\frac{V_{GSN6} - V_{TH1}}{\eta_N V_T}\right) \tag{17}$$

When the influence of MN8 tube is not considered, the ratio of MP5 leakage current $I_{DP5}$ to MP6 leakage current $I_{DP6}$ is as follows:

$$\frac{I_{DP5}}{I_{DP6}} = \frac{I_{DN6}}{I_{DN7}} = 1 - \exp\left(-\frac{V_{GSN6}}{V_T}\right) \tag{18}$$

Since $V_{GSN6}$ gradually decreases with the increase of temperature, assuming that $V_{GSN6}$=4VT is satisfied when the temperature is T=T1, when T<T1, $V_{GSN6}$>4VT, the exponential term in equation (18) is about 0, at this time $I_{DP5}$ and $I_{DP6}$ are basically equal, $V_{PTAT}$ voltage is proportional to absolute temperature and is a primary function of temperature. When T>T1, $V_{GSN6}$<4VT, and the exponential term in equation (18) is greater than zero, and gradually increases with the increase of temperature. Therefore, in the high temperature segment, the current ratio of $I_{DP5}$ and $I_{DP6}$ gradually decreases with the increase of temperature, and the first-order temperature coefficient of $V_{PTAT}$ decreases, and the exponential function will introduce the higher-order term of temperature, so that the precision of the reference source becomes worse.

In the present invention, in order to eliminate the nonlinear term introduced by the current difference of $I_{DP5}$ and $I_{DP6}$, the leakage current of MN8 tube operating in the cut-off zone is used to compensate the current difference value. When the gate and source of the MN8 tube are grounded, it works in the cutoff region, but the leakage current of the MN8 tube is not zero and cannot be ignored, and can still be described by the current expression of the sub-threshold region. The width to length ratio of MN8 tube is KN8, and the leakage current of MN8 tube with gate-source grounding can be expressed as:

$$I_{DN8} = K_{N8} I_0 \exp\left(-\frac{V_{TH1}}{\eta_N V_T}\right)\left[1 - \exp\left(\frac{V_{GSN6}}{V_T}\right)\right] \tag{19}$$

When the leakage current of the eighth NMOS tube MN8 is considered, the current flowing through the fifth PMOS tube MP5 is the sum of $I_{DN6}$ and $I_{DN8}$. The current flowing through the sixth PMOS tube MP6 is the same as $I_{DN7}$. It can be obtained that the ratio of MP5 leakage current $I_{DP5}$ to MP6 leakage current $I_{DP6}$ at this time is:

$$\frac{I_{DP5}}{I_{DP6}} = 1 - \exp\left(-\frac{V_{GSN6}}{V_T}\right) + \frac{K_{N8}}{K_{N6}}\exp\left(-\frac{V_{GSN6}}{\eta_N V_T}\right) - \frac{K_{N8}}{K_{N6}}\exp\left(-\frac{V_{GSN6}}{V_T} - \frac{V_{GSN6}}{\eta_N V_T}\right) \tag{20}$$

In equation (20), the sub-threshold slope of NMOS tube $\eta_N$ is a process-related parameter, generally around 1.5. The third index item has less impact than the first two index items and can be ignored in the analysis. Because the symbols of the first exponential term and the second exponential term are opposite, the higher order terms of temperature in $V_{PTAT}$ can be reduced or even offset by selecting the appropriate width to length ratio $K_{N8}$ of MN8 tube and the width to length ratio $K_{N6}$ of the sixth NMOS tube MN6, thereby reducing the temperature coefficient of the reference voltage source and obtaining the reference voltage $V_{REF}$, which is basically temperature-independent.

In the invention, by adjusting the width to length ratio of the fourth NMOS tube $K_{N4}$, the width to length ratio of the fifth NMOS tube $K_{N5}$, the width to length ratio of the fifth PMOS tube $K_{P5}$ and the width to length ratio of the sixth PMOS tube $K_{P6}$, the primary term of temperature in the reference voltage $V_{REF}$ can be offset. At the same time, by adjusting the width to length ratio of the eighth NMOS tube $K_{N8}$ and the width to length ratio of the sixth NMOS tube $K_{N6}$, the secondary temperature term of $V_{REF}$ can be offset and the higher order temperature term can be reduced to carry out high-order curvature compensation and improve the accuracy of the reference source.

The reference voltage source of the invention can be applied to mobile portable devices, implantable medical devices, wireless sensor network nodes and other electronic systems to provide a reference voltage that is basically independent of temperature, power supply voltage and process change for modules such as A/D converters, D/A converters and a comparer. The reference voltage source can operate at a supply voltage of 0.45-1.2V, and the output average is 234.5 mV reference voltage. When the power supply voltage is 0.45V and the temperature range is −40~125° C., the temperature coefficient of the reference voltage is 5.7 ppm/° C. Power consumption at room temperature is 3.7 nW. The chip area of the resistance-free CMOS reference voltage source designed by the invention is about 35 μm×18 μm.

The invention provides two specific examples, as follows:

EXAMPLE 1

When the power supply voltage is applied, the starting circuit is activated, so that the reference voltage source circuit from the zero state operating point into the normal operating state. This starting circuit ensures that the circuit starts from zero state and avoids uncertain starting conditions.

After the starting circuit is activated, the self-bias current source circuit begins to work, generating current on the nanoampere scale, providing bias current to the positive temperature coefficient voltage generation circuit. In addition, the self-bias current source circuit also outputs a negative temperature coefficient voltage $V_{CTAT}$.

The positive temperature coefficient voltage generation circuit uses this bias current to produce a positive temperature coefficient voltage $V_{PTAT}$. It compensates the negative temperature coefficient voltage generated by the self-bias current source by using the leakage current of the NMOS tube in the cut-off zone for high order curvature compensation. As a result, the circuit outputs a reference voltage $V_{REF}$ that is basically temperature-independent.

EXAMPLE 2

The self-bias current source circuit includes the second PMOS tube MP2, the third PMOS tube MP3, the third NMOS tube MN3, the fourth NMOS tube MN4 and the fifth NMOS tube MN5. Among them, the fifth NMOS tube MN5 is a high-threshold thick-gate NMOS tube, and the others are low-threshold MOS tubes.

The source of the second PMOS tube MP2 and the third PMOS tube MP3 are connected to the supply voltage. The gate and drain of the second PMOS tube MP2 are shorted and connected to the gate of the third PMOS tube MP3 and the drain of the third NMOS tube MN3.

The gate and drain of the fourth NMOS tube MN4 are shorted and connected to the drain of the third PMOS tube MP3 and the gate of the fifth NMOS tube MN5, whose source is connected to the drain of the fifth NMOS tube MN5.

The source of the fifth NMOS tube MN5 is grounded and its drain is connected to the gate of the third NMOS tube MN3 and the source of the fourth NMOS tube MN4. Then, the negative temperature coefficient voltage $V_{CTAT}$ is output from the drain of the fifth NMOS tube MN5.

This configuration enables a resistance-free design that delivers current on the nanoampere scale, significantly reducing power consumption and chip area.

It should be noted that examples of the invention can be realized by hardware, software, or a combination of software and hardware. The hardware part can be realized by using special logic. The software portion can be stored in memory and executed by an appropriate instruction execution system, such as a microprocessor or specially designed hardware. A person of ordinary skill in the art may understand that the above devices and methods may be implemented using computer-executable instructions and/or contained in processor control code, Such code is provided, for example, on a carrier medium such as a disk, CD or DVD-ROM, on a programmable memory such as read-only memory (firmware), or on a data carrier such as an optical or electronic signal carrier. The device and its module of the invention can be realized by hardware circuits of programmable hardware devices such as VLics or gate arrays, semiconductors such as logic chips, transistors, etc., or by software executed by various types of processors. It can also be achieved by a combination of the above hardware circuits and software, such as firmware.

The embodiment of the invention has achieved some positive effects in the process of research and development or use, and indeed has great advantages compared with the prior art. The following contents are described in combination with the data and charts of the test process.

The resistance-free CMOS reference voltage source circuit of the invention is designed based on TSMC N12 nm CMOS process, and is verified by simulation using Cadence Spectre software.

Figure 3:
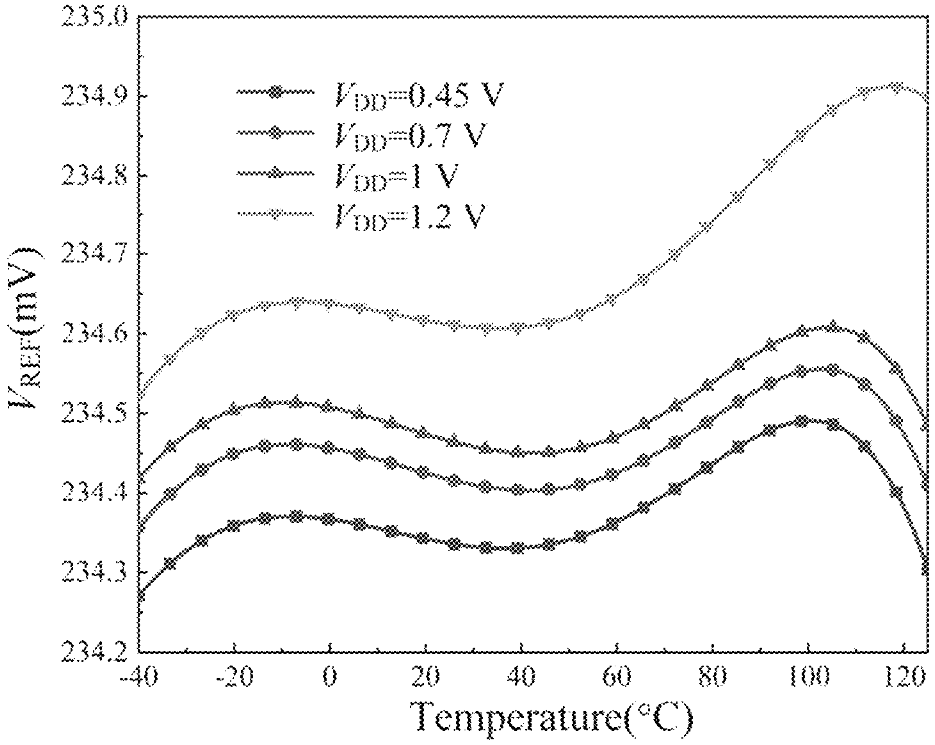
FIG. 3 shows the relationship between the simulated reference voltage $V_{REF}$ and temperature when the power supply voltage $V_{DD}$ takes different values, under the temperature varies from −40° C. to 125° C.

At the TT process angle, the temperature changes in the range of −40° C.~125° C. When the power supply voltage $V_{DD}$ takes different values, the relationship between the simulated reference voltage $V_{REF}$ and temperature is shown in FIG. 3. It can be seen that the output voltage $V_{REF}$ of the reference voltage source is about 234.5 mV. When the $V_{DD}$ is 0.45V, 0.7V, 1V and 1.2V, the $V_{REF}$ changes by 0.22 mV, 0.20 mV, 0.19 mV and 0.39 mV respectively, and the temperature coefficients are 5.7 ppm/° C., 5.2 ppm/° C., 4.9 ppm/° C. and 10.1 ppm/° C., respectively.

The above is only the specific embodiment of the invention, but the scope of protection of the invention is not limited to this, and any modification, equivalent replacement and improvement made by any technical person familiar with the technical field within the technical scope disclosed by the invention and within the spirit and principles of the invention shall be covered by the scope of protection of the invention.

What is claimed is:

1. A low power consumption and high precision resistance-free CMOS reference voltage source, comprising a starting circuit, a self-bias current source circuit and a positive temperature coefficient voltage generation circuit;

the starting circuit causes the low power consumption and high precision resistance-free CMOS reference voltage source to break away from a zero state operating point and enter a normal working state; the self-bias current source circuit generates current on a nanoampere scale, provides a bias current to the positive temperature coefficient voltage generation circuit, and outputs a negative temperature coefficient voltage $V_{CTAT}$; the positive temperature coefficient voltage generation circuit generates a voltage $V_{PTAT}$ with a positive temperature coefficient voltage to compensate the negative temperature coefficient voltage generated by the self-bias current source circuit, and uses a leakage current of a NMOS tube working in a cut-off zone to perform higher-order curvature compensation, and outputs a reference voltage $V_{REF}$ independent of temperature;

the self-bias current source circuit comprises a second PMOS tube MP2, a third PMOS tube MP3, a third NMOS tube MN3, a fourth NMOS tube MN4 and a fifth NMOS tube MN5, and the fifth NMOS tube MN5 is a thick gate NMOS tube with high threshold value, and the others of the self-bias current source circuit are MOS tubes with low threshold value;

a source of the second PMOS tube MP2 and a source of the third PMOS tube MP3 are connected to a power supply voltage, and a gate and a drain of the second PMOS tube MP2 are shorted and connected to a gate of the third PMOS tube MP3 and to a drain of the third NMOS tube MN3, a source of the third NMOS tube MN3 is grounded;

a gate and a drain of the fourth NMOS tube MN4 are short-connected and connected to a drain of the third PMOS tube MP3 and to a gate of the fifth NMOS tube MN5, and a source of the fourth NMOS tube MN4 is connected to a drain of the fifth NMOS tube MN5;

a source of the fifth NMOS tube MN5 is grounded, and the drain of the fifth NMOS tube MN5 is connected to a gate of the third NMOS tube MN3 and to the source of the fourth NMOS tube MN4, and outputs the negative temperature coefficient voltage $V_{CTAT}$ from the drain of the fifth NMOS tube MN5;

the positive temperature coefficient voltage generation circuit comprises a fourth PMOS tube MP4, a fifth PMOS tube MP5, a sixth PMOS tube MP6, a sixth NMOS tube MN6, a seventh NMOS tube MN7 and an eighth NMOS tube MN8, all of which adopt a low threshold MOS tube;

a gate of the fourth PMOS tube MP4 is connected to the gate of the second PMOS tube MP2, and a drain of the fourth PMOS tube MP4 is connected to a source of the fifth PMOS tube MP5 and to a source of the sixth PMOS tube MP6, and a source of the fourth PMOS tube MP4 is connected to the power supply voltage;

the source of the fifth PMOS tube MP5 is connected to the source of the sixth PMOS tube MP6 and to the drain of the fourth PMOS tube MP4, and a gate of the fifth PMOS tube MP5 is connected to the drain of the fifth NMOS tube MN5, and a drain of the fifth PMOS tube MP5 is connected to a drain of the sixth NMOS tube MN6;

the source of the sixth PMOS tube MP6 is connected to the drain of the fourth PMOS tube MP4, and a gate and a drain of the sixth PMOS tube MP6 are shorted and connected to a drain of the seventh NMOS tube MN7, and the gate and the drain of the sixth PMOS tube MP6 are shorted and the reference voltage $V_{REF}$ is output from the drain of the sixth PMOS tube MP6;

a gate and the drain of the sixth NMOS tube MN6 are shorted and connected to the drain of the fifth PMOS tube MP5 and to a gate of the seventh NMOS tube MN7, and the source of the sixth NMOS tube MN6 is grounded; the drain of the seventh NMOS tube MN7 is connected to the drain of the sixth PMOS tube MP6, and a source of the seventh NMOS tube MN7 is grounded; a gate and a source of the eighth NMOS tube MN8 are grounded, and a drain of the eighth NMOS tube MN8 is connected to the drain of the fifth PMOS tube MP5 and to the drain and the gate of the sixth NMOS tube MN6 and to the gate of the seventh NMOS tube MN7;

wherein, the starting circuit comprises a first PMOS tube MP1, a first NMOS tube MN1 and a second NMOS tube MN2, all of which adopt a low threshold MOS tube;

a drain and a source of the first PMOS tube MP1 are connected to the power supply voltage, and a gate of the first PMOS tube MP1 is connected to a drain of the second NMOS tube MN2 and to a gate of the first NMOS tube MN1; a gate of the second NMOS tube MN2 is connected to the gate of the third NMOS tube MN3 and to the drain of the fifth NMOS tube MN5 and to the source of the fourth NMOS tube MN4; a drain of the first NMOS tube MN1 is connected to the drain of the third NMOS tube MN3 and to the drain and the gate of the second PMOS tube MP2 and to the gate of the third PMOS tube MP3, and a source of the first NMOS tube MN1 and a source of the second NMOS tube MN2 are grounded.

* * * * *